(12) United States Patent
Poisner et al.

(10) Patent No.: US 7,398,383 B2
(45) Date of Patent: * Jul. 8, 2008

(54) METHOD AND SYSTEM FOR USING INTERNAL FIFO RAM TO IMPROVE SYSTEM BOOT TIMES

(75) Inventors: David I. Poisner, Folsom, CA (US); William A. Stevens, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 11/192,025

(22) Filed: Jul. 29, 2005

(65) Prior Publication Data

US 2005/0268083 A1     Dec. 1, 2005

Related U.S. Application Data

(63) Continuation of application No. 09/888,562, filed on Jun. 26, 2001, now Pat. No. 6,938,153.

(51) Int. Cl.
*G06F 15/177* (2006.01)
(52) U.S. Cl. .............................................. 713/2; 713/1
(58) Field of Classification Search .................... 713/1, 713/2, 100
See application file for complete search history.

(56) References Cited

U.S. PATENT DOCUMENTS

| 5,063,499 A | 11/1991 | Garber |
| 5,805,882 A | 9/1998 | Cooper et al. |
| 6,038,632 A | 3/2000 | Yamazaki et al. |
| 6,195,749 B1 | 2/2001 | Gulick |

*Primary Examiner*—Dennis M Butler
(74) *Attorney, Agent, or Firm*—Kenyon & Kenyon LLP

(57) ABSTRACT

Embodiments of methods and systems for improving boot-up time in computer systems utilize RAM in devices separate from the main memory, normally dedicated to another function, to provide a stack and temporary storage during BIOS execution, enabling BIOS to call subroutines and execute in a multi-threading fashion, speeding system boot-up.

17 Claims, 3 Drawing Sheets

METHOD AND SYSTEM FOR USING INTERNAL FIFO RAM TO IMPROVE SYSTEM BOOT TIMES

This is a continuation of application Ser. No. 09/888,562 filed 26 Jun. 2001 now U.S. Pat. No. 6,938,153, the content of which is incorporated herein by reference.

TECHNICAL FIELD

The present invention relates to the utilization of random access memory (RAM) in an integrated circuit chipset, and more particularly to a method and system for using RAM, otherwise dedicated to other functions, for initialization routines executed during system boot-up.

BACKGROUND OF THE INVENTION

A reduced boot time increases the attractiveness of a given system as compared to competing systems in the marketplace. Accordingly, boot time reduction has been a focus of developmental efforts among makers and marketers of computer products.

A factor in the duration of the boot-up process is the execution of the known basic input/output system (BIOS) program which is an integral part of most computer systems. The BIOS program is usually triggered by a system power-on or reset, and performs a number of initialization routines, including memory and disk initialization, to prepare the system for normal usage.

Typical BIOS code must execute serially early in the boot process because there is no memory available for a stack and temporary variable storage. Thus, BIOS code is typically somewhat lengthy and convoluted. If a stack and temporary variable storage were available, it would be possible for the BIOS to execute subroutines, thereby operating in a "multithreading" fashion in which separate subroutines execute in parallel. This would speed boot-up by allowing, for example, disk initialization and memory initialization to be started and executed almost at the same time. Further, the BIOS program could be coded in high-level languages as opposed to the assembly language which is typical of current BIOS programs.

Moreover, if a stack and temporary storage were available to the BIOS routine, the CPU's main cache could be used as a true code cache (rather than for stack area), resulting in improved boot times.

Notwithstanding the advantages that could be realized by providing RAM to the BIOS program for a stack and temporary variable storage, practical aspects of chip production place limits on the amount of RAM available. For example, it is estimated that the amount of RAM needed for a stack and other temporary storage is in the 1 K-byte range. Adding this much RAM to an existing chipset would be very expensive, especially if it was only used during system boot-up.

In view of the foregoing considerations, there is a need to reduce boot time while making efficient use of available RAM.

DETAILED DESCRIPTION

According to embodiments of the invention, RAM in devices separate from the main memory ("separate RAM") may be used for a stack and temporary storage during BIOS execution. The separate RAM is typically dedicated, in its normal usage, to one or more functional logic blocks of a chipset. For example, RAM in a local area network (LAN) controller is available during BIOS execution. A LAN controller includes thousands of bytes of RAM that are normally used to transmit data packets. However, applications are not able to send data packets until the main memory is fully configured, which does not occur until BIOS has finished performing this task. Accordingly, there is RAM in the LAN controller which is unused until BIOS execution has completed, and is therefore available to speed BIOS execution itself. Similarly, a universal serial bus (USB) controller includes RAM unused for its normal function during BIOS execution, and therefore available to BIOS. Various other (non-main memory) RAMs are available in a typical chipset.

According to embodiments of the invention, a selected range of available physical address space supported by the central processing unit (CPU), but not populated by physical main memory, may be mapped to separate RAM. Usually, there is substantially more physical address space supported than is needed to address the actual physical memory (e.g., SIMM (single inline memory module) or DIMM (dual inline memory module) DRAM (dynamic RAM)) installed in a system.

In accordance with embodiments of the invention, during boot-up, an operational mode may be entered in which space in separate RAM is made available to the BIOS program for a stack and temporary storage. In an embodiment, this operational mode may be set by programming an enable bit in the chipset. The enable bit may be automatically turned on or may be set by the BIOS routine. The BIOS routine may then initialize the stack pointer of the CPU to point to an address in the selected range of addresses mapped to the separate RAM.

According to this embodiment, subsequent instructions of the BIOS program may now include operations on a stack, such as "push" or "pop" instructions for calling subroutines, to write to or read from the stack pointed to by the CPU's stack pointer. When the address in the stack pointer is asserted on the CPU's address bus due to, for example, a push or pop instruction, and the chipset is in the operational mode for using separate RAM for BIOS processing, the address is recognized as being within the range mapped to the separate RAM, and the appropriate data is accordingly written to or read from the selected range of addresses in the separate RAM.

Figure 1A:
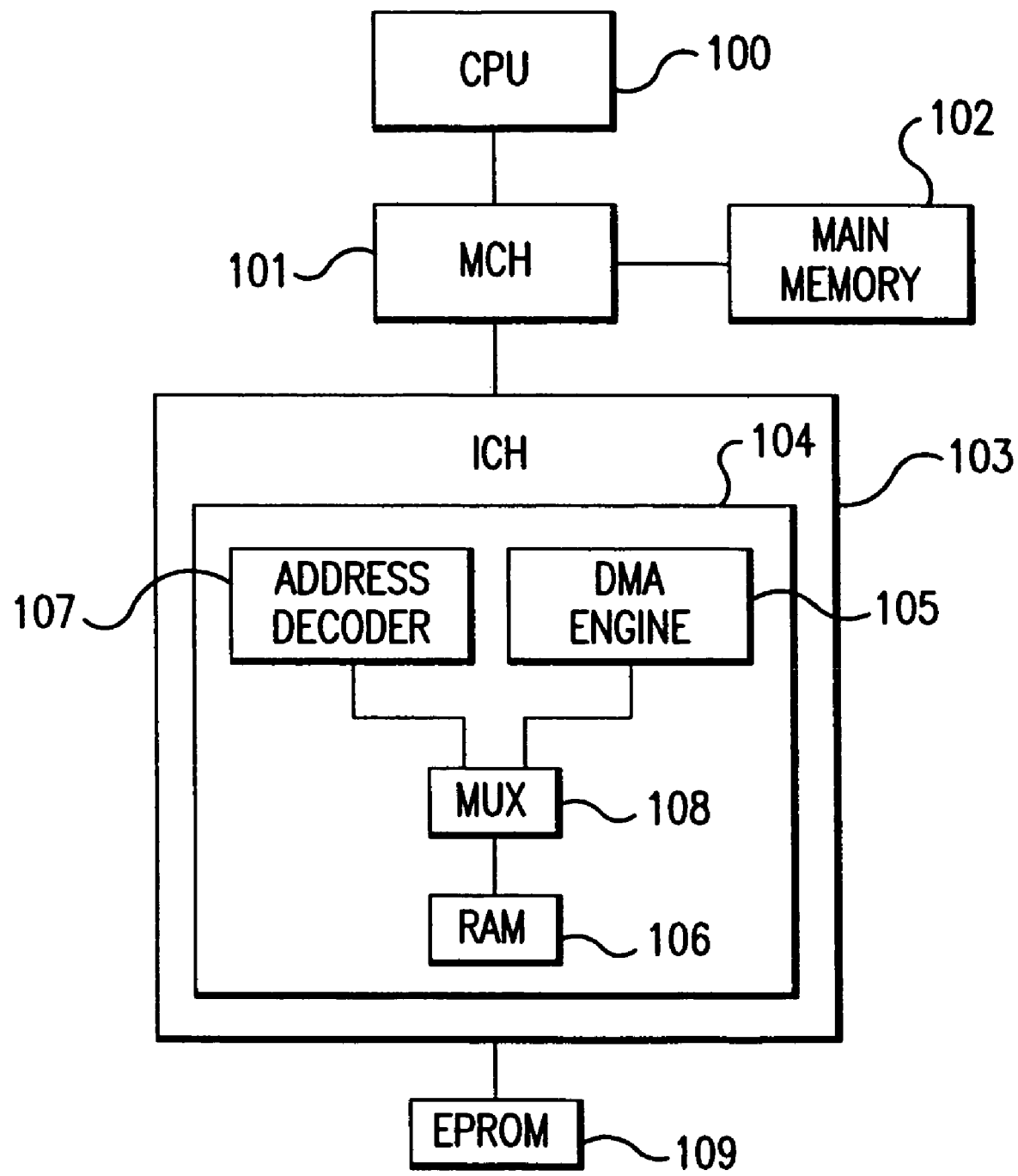
FIG. 1A is a block diagram of a chipset according to an embodiment of the invention.

An exemplary embodiment of the invention is shown in FIG. 1. FIG. 1 illustrates components in an Intel® chipset architecture used in personal computers. The chipset includes a CPU 100 connected to a memory controller (MCH or Memory Control Hub) 101. The MCH is connected to main memory 102, and performs reads and writes to main memory 102 under the control of an instruction sequence executed by the CPU 100.

The MCH is further connected to an I/O controller (ICH or I/O control hub) 103 comprising a USB controller 104. The USB controller 104 includes a separate RAM 106.

As indicated above, according to embodiments of the invention, a selected range of available physical address space supported by the CPU, but not populated by physical main memory, may be mapped to space in separate RAM 106. In an embodiment, the addresses in the selected range may be higher than the highest location in main memory addressable by the MCH, or "top of memory." Top of memory is the highest address in the physical address space supported by the CPU at which there is corresponding physically populated memory. By mapping the selected range above top of memory, it is ensured that the address range assigned to RAM 106 will not conflict with a range assigned to main memory 102 when main memory is enabled.

Accordingly, in this embodiment, when during the execution of a stack operation called for by the BIOS program 109, the CPU attempts to access an address above top of memory, the MCH recognizes that it is unable to perform the access and passes the address to the ICH 103.

Direct memory access (DMA) engine 105 as shown in FIG. 1 represents already existing logic in the ICH for moving data between the RAM 106 and main memory 102 under the normal operating circumstances (i.e., post-boot-up) of the USB controller. Normally, the CPU is unable to directly access the RAM 106. Rather, the RAM 106 is only used locally by the DMA engine 105 and is treated as a first-in-first-out (FIFO) buffer, though the RAM is physically implemented as a RAM with two ports.

Address decoder 107 and multiplexer (MUX) 108, on the other hand, represent elements of the present invention according to the exemplary embodiment under discussion. In this embodiment, the address decoder 107 may be configured to decode the selected range of addresses mapped to the RAM 106, enabling the CPU to access the RAM 106 when an address within the selected range is passed to the ICH by the MCH. The MUX 108 may be configured to be responsive to the operational mode set during system boot-up. For example, the MUX may be controlled by the enable bit to select access to the RAM 106 by either address decoder 107 or DMA engine 105.

Figure 2:
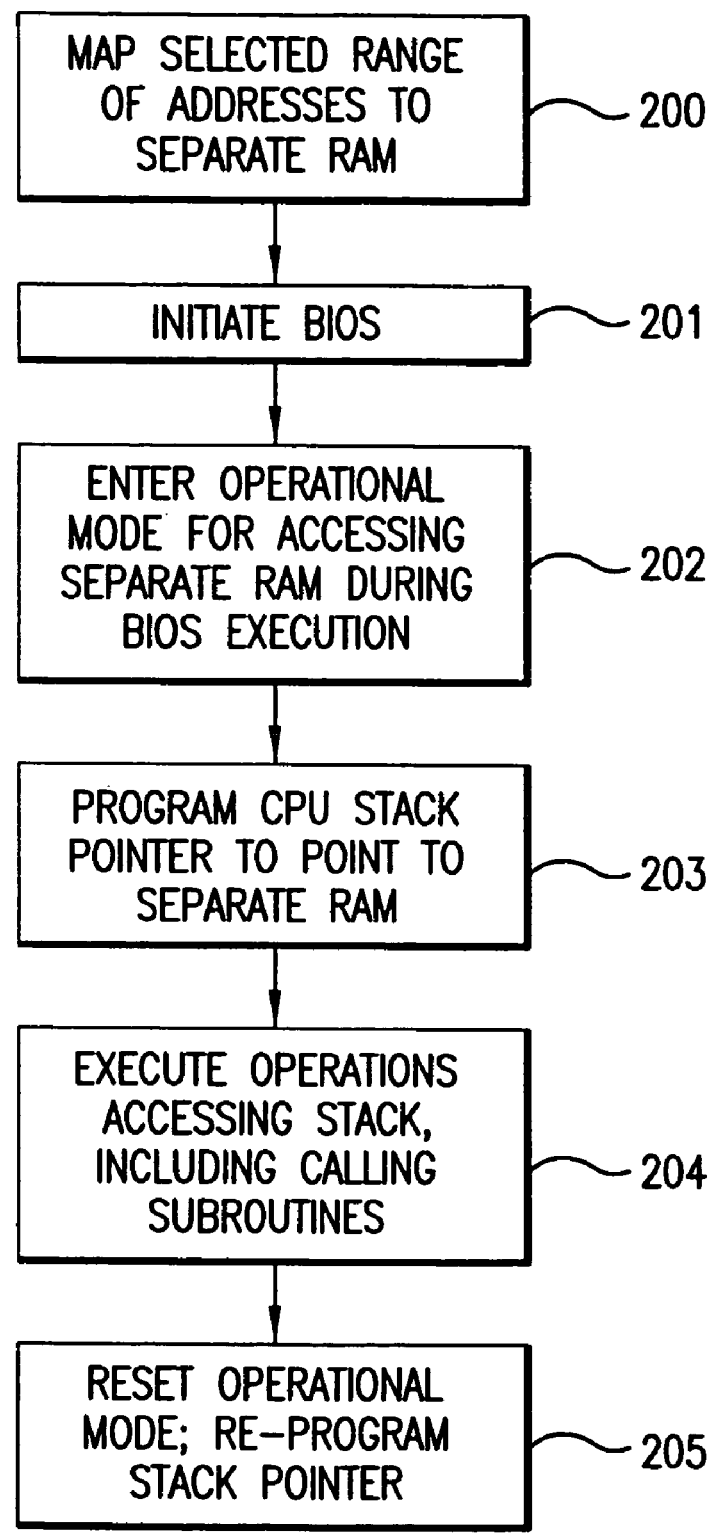
FIG. 2 is a flow diagram illustrating a method according to an embodiment of the invention.

Referring to FIG. 2, an illustrative example of an embodiment of an application of the invention follows.

As shown in block 200, a selected range of addresses including, for example, address x'FFFF6000, may be mapped to space in the RAM 106. Address x'FFFF6000 is typically well above top of memory.

Due to a system power-on or reset, main memory is unconfigured and the MCH has no information about the main memory. The CPU executes its first instruction cycle, in which it attempts an access to memory. Since the MCH has no information about main memory, it transfers the attempted memory access to the ICH. The ICH searches for attached memory, and finds the EPROM (erasable programmable read-only memory) 109 storing the BIOS program. Accordingly, the CPU begins to fetch the instructions of the BIOS program, as shown in block 201

Then, an operational mode for accessing the RAM 106 to use space therein as a stack may be entered, as shown in block 202. In an embodiment, the operational mode may be controlled by an enable bit. The enable bit may be automatically turned on at system power-up or reset, or may be set by an instruction in the BIOS program. The enable bit may control the MUX 108 to select the input from the address decoder 107 rather than the DMA engine 105. Once the BIOS has substantially completed its work, the enable bit will be reset to indicate that the RAM 106 is to be returned to its normal usage, and no longer used for a stack.

As shown in block 203, as one of its initial steps, the BIOS program may set the stack pointer of the CPU to the value x'FFFF6000. While in current systems the BIOS program does initialize the CPU's stack pointer, this occurs much later in the BIOS process. Moreover, the stack pointed to is in main memory and can only be used after main memory is configured. By contrast, according to the present invention, a stack is available in separate RAM substantially from the outset of the BIOS process.

Once the CPU's stack pointer is initialized, the BIOS program may execute stack operations which will access the RAM 106, including calling subroutines, as shown in block 204. Whenever the CPU 100 asserts an address within the range mapped to RAM 106 and the enable bit is set, the MCH 101 will pass the address to the ICH 103, since the address is not one that the MCH can handle. The address will appear on an internal address bus of the ICH and be decoded by address decoder 107 to access the stack in RAM 106.

As discussed above, the BIOS code is typically very lengthy and would be greatly expedited if enabled to use a stack. Availability of a stack enables the BIOS program to be coded more easily and compactly, since subroutines may be called. Further, parallelism is possible due to multi-threading, and consequently the BIOS process is significantly speeded up.

Once the BIOS program has executed past a certain point, for example, once main memory is fully configured, the stack in separate RAM is no longer needed and normal chipset operations are possible. Accordingly, the CPU's stack pointer may be re-programmed to point to main memory and the enable bit may be reset so that accesses to RAM 106 are made only by DMA engine 105, as shown in block 205.

In an alternative embodiment of the invention, a separate RAM may be shared for use in its normal or dedicated function, and also for providing stack space to the BIOS program. For example, BIOS processing may advance to a stage wherein normal operations by the USB controller are possible, but main memory is still not fully configured, and therefore a stack in separate RAM is still needed or useful. To enable USB operations to proceed at the same time as BIOS processing continues, a portion of the RAM 106 could be reserved for access by the DMA 105, while another portion could be set aside for a stack for the BIOS program.

Figure 1B:
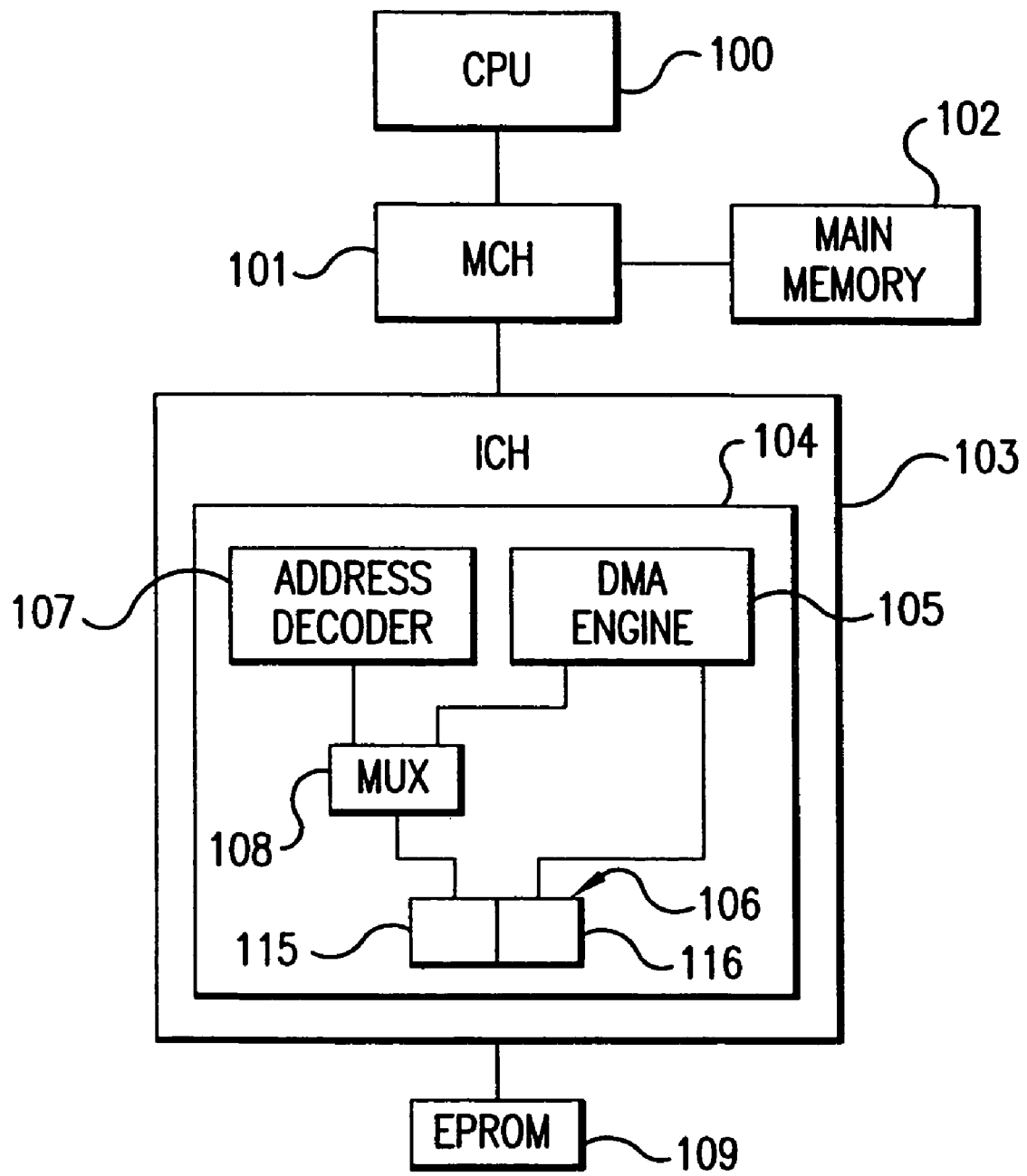
FIG. 1B is a block diagram of a chipset according to an alternative embodiment of the invention.

FIG. 1B illustrates such an alternative embodiment. In FIG. 1B, RAM 106 is divided into a first portion 115 and a second portion 116. The first and second portions need not be equal in size and can take on any desired relative proportions. The first portion 115 may be set aside for a stack and accessible as described in the foregoing. That is, an operational mode may control MUX 108 to determine whether the first portion 116 is accessed by address decoder 107 or by DMA engine 105. Second portion 116, on the other hand, may be coupled to DMA engine 105 and accessible independently of the operational mode controlling the MUX. Thus, second portion 116 may be available for operations by the USB as soon as BIOS processing has advanced to a stage wherein such operations are possible. While the efficiency of the USB operations might be somewhat reduced during a period of sharing the RAM 106, sharing would allow USB operations to proceed in parallel with BIOS processing, thereby reducing delay in available chipset functions. Once BIOS processing was complete, the stack space could be returned to the USB controller, which would then operate with full efficiency.

A BIOS program including computer-executable instructions according to embodiments of the present invention may be stored and transported on a computer-usable medium such as diskette, magnetic tape, disk or CD-ROM. The instructions may be downloaded to a second storage medium such as EPROM 109, from which they may be fetched and executed by a processor such as CPU 100 to effect the advantageous features of the invention.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer comprising:
   a CPU;
   a peripheral device; and
   a RAM located in the peripheral device and including first and second portions, the first portion being at least temporarily accessible to the CPU for BIOS processing, and the second portion being reserved for an operation of the peripheral device, wherein the first and second portions are usable in parallel by the CPU and the peripheral device respectively.

2. The computer of claim 1, further comprising enable logic to control whether the first portion is accessible to the CPU.

3. The computer of claim 1, wherein the peripheral device is a USB (Universal Serial Bus) controller.

4. The computer of claim 1, wherein the peripheral device is a LAN (Local Area Network) controller.

5. A method comprising:
   allocating a first portion of a RAM separate from main memory for use by the CPU as a stack during BIOS processing;
   reserving a second portion of the RAM for an operation of a peripheral device; and
   performing the BIOS processing and an operation of the peripheral device in parallel, using the first and second portions respectively.

6. The method of claim 5, further comprising making the first portion available to the peripheral device after at least a part of the BIOS processing has completed.

7. The method of claim 5, further comprising setting an enable value to indicate that the first portion is to be used by the CPU.

8. The method of claim 7, further comprising resetting the enable value after at least a part of the BIOS processing has completed to indicate that the first portion is available to the peripheral device.

9. A system comprising:
   a CPU; and
   a RAM separate from main memory and accessible to the CPU for use as a stack during BIOS processing;
   wherein the RAM is divided into a first portion and second portion, and only said first portion is accessible to the CPU, and wherein the first and second portions are usable in parallel by the CPU and peripheral device respectively.

10. The system of claim 9, wherein the separate RAM is located in a peripheral device of a computer.

11. The system of claim 10, wherein the second portion is dedicated to a function of the peripheral device.

12. The system of claim 10, further comprising enable logic to control whether the first portion is accessible to the CPU.

13. A method comprising:
    booting up a computer system; and
    performing both BIOS processing and an operation of a peripheral device of the computer system in parallel, using a RAM located in the peripheral device.

14. The method of claim 13, wherein the RAM includes first and second portions, the first portion being at least temporarily accessible to a CPU of the computer system for the BIOS processing, and the second portion being dedicated to the peripheral device.

15. The method of claim 14, further comprising making the first portion available to the peripheral device after at least a part of the BIOS processing has completed.

16. The method of claim 13, wherein the BIOS processing includes using a stack.

17. The method of claim 13, wherein a range of address space used for the BIOS processing is beyond a main memory range.

* * * * *